Sept. 16, 1958  J. R. BIRD ET AL  2,852,741
DIRECTIONAL WATTMETER
Filed March 25, 1953  3 Sheets-Sheet 1
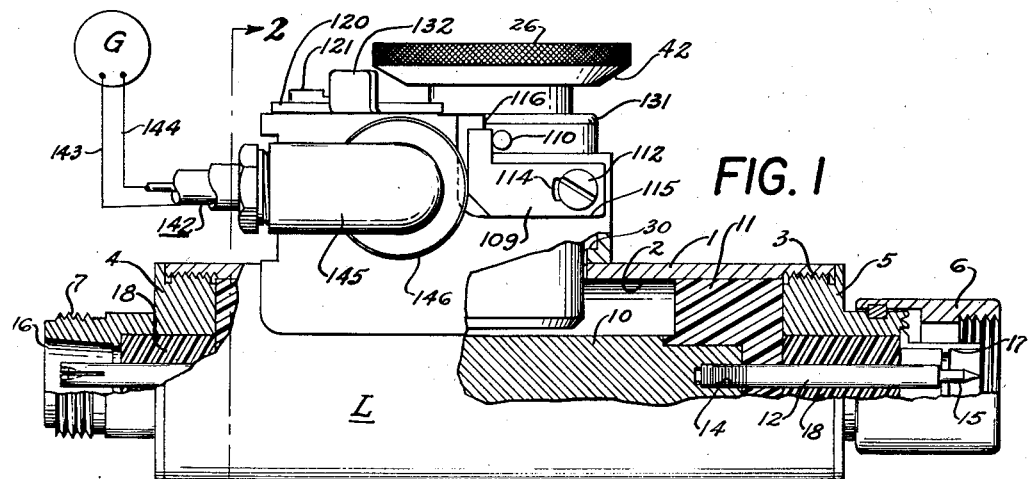
FIG. 1
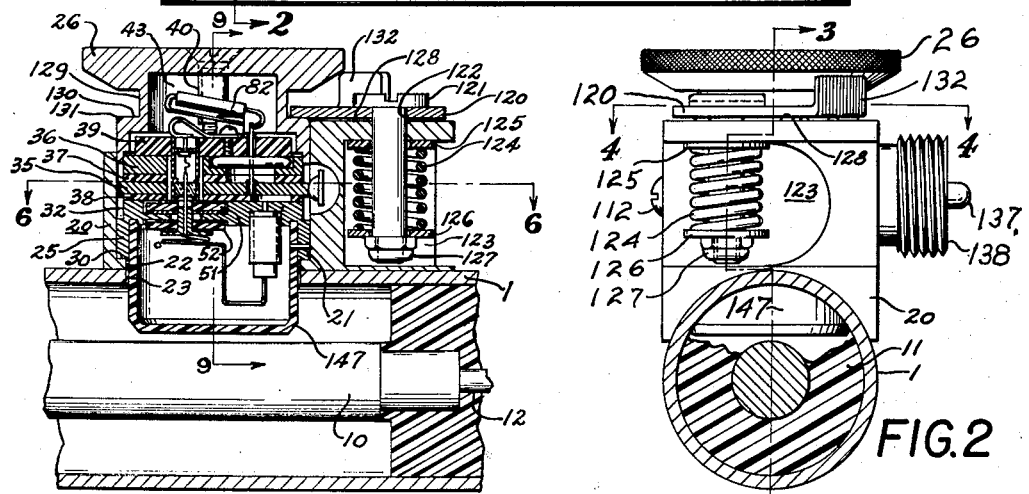
FIG. 2
FIG. 3
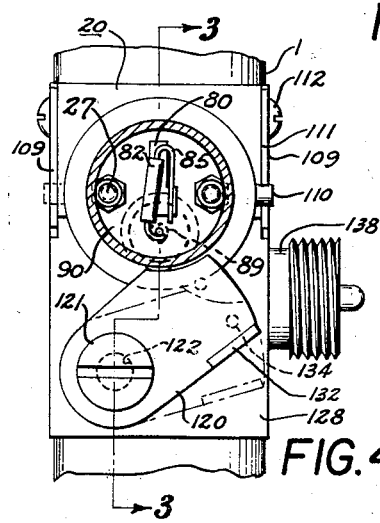
FIG. 4
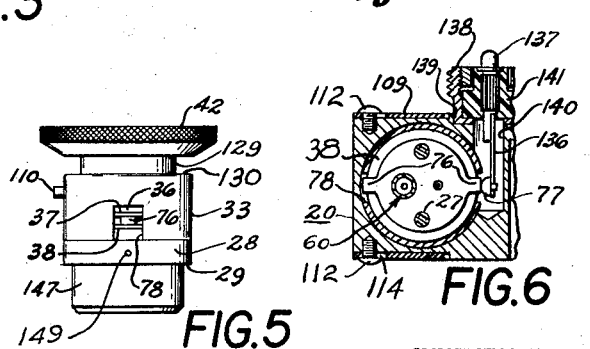
FIG. 5
FIG. 6
INVENTORS,
JAMES R. BIRD
HENRY J. CALDERHEAD
BY
George Knowles
ATTORNEY Sept. 16, 1958
J. R. BIRD ET AL
2,852,741
DIRECTIONAL WATTMETER
Filed March 25, 1953
3 Sheets-Sheet 2
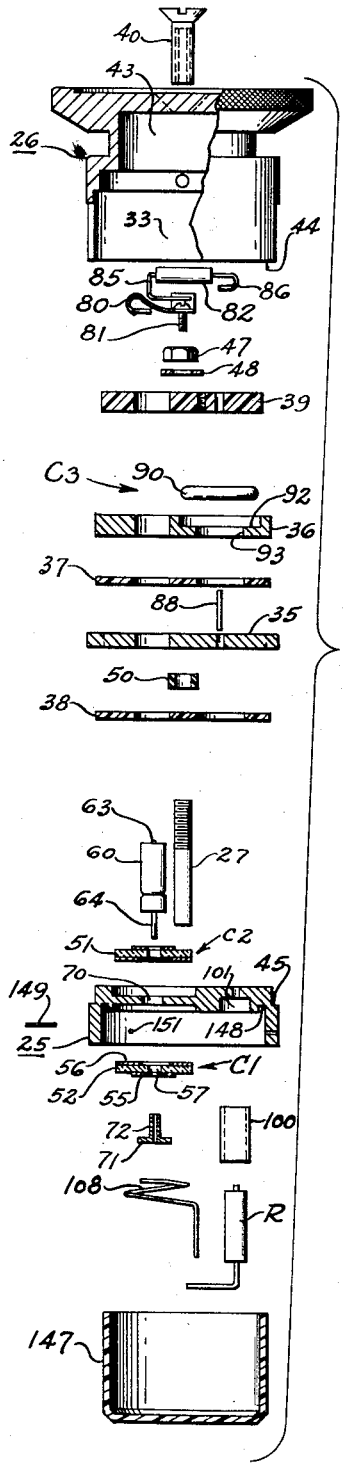
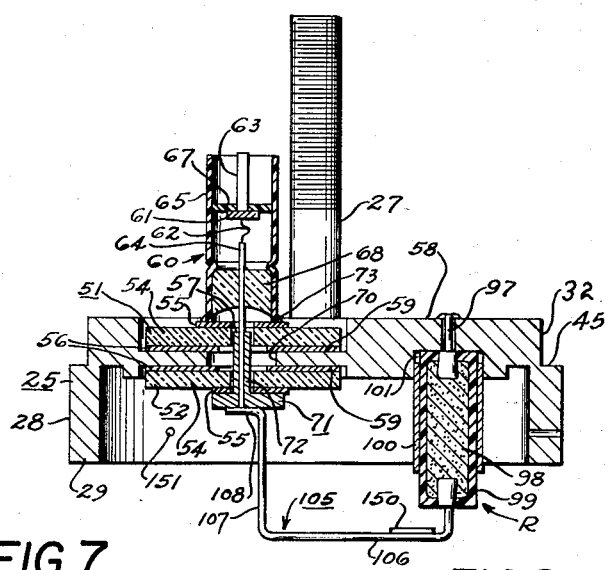
FIG.7  FIG.8
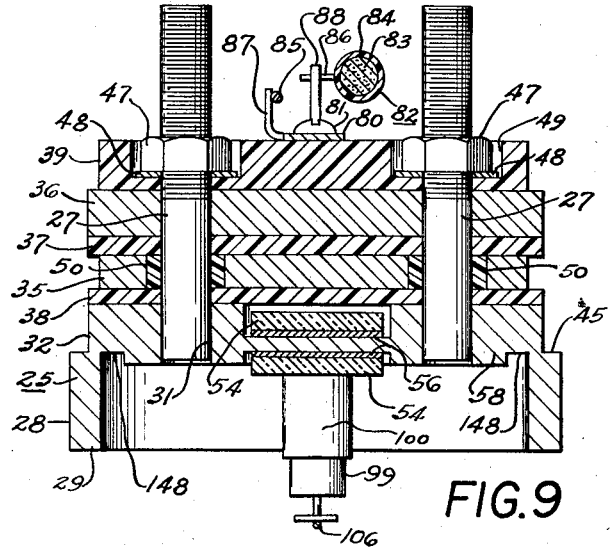
FIG.9
INVENTORS,
JAMES R. BIRD
HENRY J. CALDERHEAD
BY
*George Knowles*
ATTORNEY INVENTORS,
JAMES R. BIRD
HENRY J. CALDERHEAD
BY
George Knowles
ATTORNEY United States Patent Office 2,852,741
Patented Sept. 16, 1958

2,852,741

DIRECTIONAL WATTMETER

James R. Bird, Chagrin Falls, and Henry J. Calderhead, Euclid, Ohio, assignors to Bird Electronic Corporation, Cleveland, Ohio, a corporation of Ohio Application March 25, 1953, Serial No. 344,542

22 Claims. (Cl. 324—95)

This invention relates to electrical systems for indicating or measuring high frequency wave signals or wave energy, mainly the measurement or detection of such wave signals or energy propagated along a tubular transmission line, especially a coaxial transmission line, and to the mode of operation, to the construction, and to the combination and connection of parts or components in such systems.

It is frequently desirable to detect or measure high frequency electrical wave signals or signal energy on a transmission line of the tubular type, a coaxial transmission line comprising an elongated inner conductor within, coaxial to and electrically insulated from an elongated tubular outer conductor being a specialized form of tubular transmission line. Measurements commonly made on such transmission lines include those of the standing wave ratio, the reflection coefficient, and the energy propagated.

Various instruments have been employed for obtaining measurements of the standing wave ratio on transmission lines of the character mentioned, one type of instrument employing a probe movable to different positions along the transmission line as in an elongated slot. The probe is connected through a suitable network to an indicator by means of which the size or magnitude of the wave at different points along the line is determined. From such information the standing wave ratio is readily calculated.

Other instruments employ directionally sensitive components, one component being arranged to indicate or respond to electrical wave signals traveling in one, or the forward, direction along the transmission line and another such component being arranged to respond only to electrical wave signals traveling in the other, or reverse, direction along the line. From information so obtained the reflection coefficient and standing wave ratio are obtained conventionally. These directional instruments employ various pickup arrangements such as probes and loops, the probes providing capacitive coupling and the loops providing inductive coupling to a transmission line. Another arrangement utilizes a resistive bridge on or across the transmission line, as disclosed in copending application for patent Serial Number 224,762.

It has been proposed to obtain separate measurements or indications of the forward and backward traveling wave signals on a transmission line by directional couplers in which a loop is subjected to the electrical field within the transmission line to provide inductive coupling, the loop being reversible in the field as by an arrangement for rotating the loop through 180°. The same loop and its associated network respond to either the forward or backward traveling wave signal, depending upon the way in which the loop is oriented. Such directional couplers of the rotatable or reversible type present special problems in mechanical design because of the relative movement of parts and the need for short connections between components in order to minimize capacitances and inductances which interfere with theoretical functioning of the detecting network or circuit.

It is known that a loop located in the electrical field between the inner and outer conductors of a coaxial line has a voltage induced therein proportional to current I in the inner conductor, there being mutual inductance M between the loop and the transmission line, the loop being positioned in the plane of the inner conductor of the line. It is also known that a series circuit of resistance R and capacitance C connected across the transmission line conductors will give a voltage across the resistance R proportional to voltage E between the line conductors. In directional couplers and so-called reflectometers the arrangements mentioned are combined in a sampling circuit in which the resistor R is connected in series with the loop and capacitive coupling is provided as by capacitor plates or armatures on the loop and the inner conductor or by capacitance effects between the components of the sampling circuit and the inner conductor. Dimensions are kept to a minimum, much less than the wave length of the energy transmitted, and in considering the theory of operation it is satisfactory to refer to lumped impedances rather than evaluating the distributed parameters. In practice, however, it has been necessary to supplement theoretical calculations with empirical methods of testing in making corrections for distributed capacitance and distributed inductance. It is in this connection that the present invention has been particularly effective in that the structural arrangements or geometry of the instrument shown permit very short connections between parts and special provision has also been made for effecting adjustments in theoretical design as dictated by results of tests and similar empirical evaluations.

Considering the sampling circuit mentioned and using lumped impedances, it is apparent that M is either positive or negative depending upon the directional relation between the loop and the wave signal energy traveling on the line. As in earlier devices, the instrument of the present invention obtains reversal of the mutual inductance M through 180° rotation of the loop relative to the transmission line. The forward traveling wave has voltage $E_f$ and current $I_f$ while the reflected traveling wave has voltage $E_r$ and current $I_r$. Thus, if $Z_0$ be the characteristic impedance of the line and $\rho$ the reflection coefficient:

$$\rho = E_r/E_f = -I_r/I_f \quad (1)$$

and $$e = jw(CRE + MI) \quad (2)$$
$$= jwE_f[CR(1+\rho) + (M/Z_0)(1-\rho)] \quad (3)$$

where $e$ is the total electromotive force induced in the loop or sampling circuit. The components are selected so that:

$$RC = \frac{M}{Z_0} = K \quad (4)$$

K being a constant. If we let $e$ be the electromotive force when M is positive so that the voltage across R and the voltage induced in the loop are additive, and let $e-$ be the electromotive force when M is negative and the voltages referred to are opposed, the former gives a maximum and the latter a minimum indication, thus:

$$e = jwE_f[K(1+\rho) + K(1-\rho)] \quad (5)$$
$$= 2jwE_fK \quad (6)$$

and $$e- = jwE_f[K(1+\rho) - K(1-\rho)] \quad (7)$$
$$= 2jwE_fK\rho \quad (8)$$

from which useful information such as the reflection coefficient and standing wave ratio can be obtained. It is also feasible to measure power P being fed through the transmission line:

$$P = EI \cos \theta = E \cdot I \quad (9)$$
$$= (E_f + E_r) \cdot (I_f + I_r) \quad (10)$$

Using known relationships between forward and reflected wave potentials, currents and reflection coefficients and algebraic methods:

$$P = \frac{E_f \cdot E_f}{Z_0} - \frac{E_r \cdot E_r}{Z_0} \quad (11)$$

$$= \frac{|E_f|^2}{Z_0}(1-|\rho|^2) \quad (12)$$

$$= \frac{|e+|^2 - |e-|^2}{4w^2 K^2 Z_0} \quad (13)$$

From the above it is clear that prior directional couplers or reflectometers have been able to give the absolute power at a known frequency. The readings have been obtained by the use of a thermocouple together with a milliammeter responding to current in the loop or sampling circuit. It has also been proposed to utilize diode contact rectifiers and certain of the more specialized aspects of the present invention are particularly concerned with the positioning and connecting of the diode rectifier, as will appear.

One of the features which characterizes the present invention is the supplementing of the sampling circuit of the loop and resistor of known instruments by a frequency compensating capacitor used in association with the diode contact rectifier and series connected in the resistor-loop circuit. This supplemental capacitor is connected in parallel relation to the diode circuit which includes the galvanometer or other indicator external to the high frequency components and is of much greater capacitance than the capacitance C coupling the loop and other components of the sampling circuit to the transmission line. The effect of such compensating capacitor is to give broad frequency band operation to directional couplers and the like of the type referred to. It is believed that, since the generated voltage in the loop resistor circuit is proportional to frequency (Eq. 2) and the impedance of the supplemental capacitor is inversely proportional to frequency, the output voltage across the capacitator can be made to remain constant, or substantially so, by suitable selection of values and provided the total impedance of the circuit remains constant. Thus the supplemental or compensating capacitor counteracts or offsets the inherent voltage rise of the reactive generator comprising the capacitive and inductive pickup system of the loop and makes the sampling circuit substantially insensitive to frequency over the designed range. It has been found practical utilizing this feature of a supplemental capacitor to construct instruments having effective ranges of 2½ to 1, and even higher ratios are feasible, such as 5 to 1. In practice, for example, an instrument made as hereinafter described is effective over a frequency range of, say, 25 to 60 megacycles, or 200 to 500 megacycles, or 400 to 1000 megacycles, depending upon the components selected in the makeup of the instrument to satisfy Equation 4.

Another characterizing feature of the present invention is concerned with the resistor R and its performance over a wide frequency band. To compensate for objectionable frequency effects and obtain more uniform characteristics at different frequencies this resistor is associated with a capacitance in shunt relation. In its preferred form the invention employs a commercial resistor of elongated cylindrical shape having an insulating body. Received about the body is a conductive element connected to one of the resistor terminals. This conductive element desirably takes the form of a tubular sleeve of brass or similar metal and at one end is received within a cylindrical socket of a conductive mounting base or body which also receives one end of the resistor. Variation in the capacitance between the conductive sleeve and the resistor is obtained by axially sliding or moving one relative to the other, this constituting a simple adjustment for use in original assembly to adapt different resistors to the circuit. The capacitor sleeve is open at one end and with the resistor enclosed constitutes an open stub coaxial capacitor.

In the system or device of the present invention and as one of its principal objects a directional coupler of the rotatable or reversible type is assembled in a compact arrangement of closely connected components to provide a rugged, reliable unit that can be easily manufactured in quantity at comparatively low cost.

Another object is to provide in a high frequency electrical system for detecting wave signals on a transmission line, the system being of the type in which a pickup unit is carried rotatably on a support mounted on the tubular conductor of the transmission line and projects into an opening in the conductor, the combination of an indicator external to the line and connected to the rotatable unit through the support in such a way that removing and replacing the pickup unit from and on the support automatically disconnects and reconnects the indicator. More specifically it is sought to provide for automatic connection of the pickup unit circuit to the indicator only in different predetermined positions of the pickup unit relative to the transmission line to insure correct orientation of the parts. In a further refinement of this aspect of the invention the support is formed with a socket into which the pickup unit, complementally shaped, is received in interfitting relation, suitable means being provided for locating the pickup unit axially relative to the support socket, for retaining the unit in the socket, and for maintaining yielding presure of the unit against the support in the region of the opening into the transmission line.

Another object is to provide an improved pickup unit for use in a high frequency electrical system of the character described, the pickup unit contemplated being a structure comprising relatively thin flat conducting and insulating elements stacked in alternating relation flatwise against one another and held between a base and a cap of conductive metal. In the preferred arrangement shown the base and cap shieldingly enclose the stacked elements and the structure constitutes a plug adapted for facile removal from and replacement in a socket of a suitable mount attached to the outer tubular conductor of the transmission line. The pickup unit of the preferred arrangement may also include a rectifier contained in a recess formed by aligned openings in the stacked elements. As a still further refinement of the pickup unit structure, the base thereof constitutes a sub-assembly mount, in that it is formed locatingly to receive circuit components including button type capacitors, the latter being receivable on opposite sides of the base and in predetermined aligned relation. As an adjunct of the removable pickup unit feature, useful in combination with the stacked element arrangement but not restricted thereto, the base of the unit is formed with a locating recess to receive one end of the resistor of the loop-resistor combination so as to predetermine the position of the loop relative to the body of the pickup.

Also associated with the pickup structure and illustrated in connection with the base subassembly feature is a novel arrangement of button capacitors and a metal shelled diode crystal rectifier which provides extremely short connections between the parts. In this arrangement the button capacitors and the rectifier are aligned on a common axis so that conductive cylindrical shell of the rectifier may be used as one terminal thereof and connected to an armature of one of the capacitors and the other terminal of the rectifier is extended through the center openings of both button capacitors and connected to the armature plate of the other capacitor.

Other objects and advantages pertaining to certain novel features of construction and combinations and arrangements of parts are apparent in the following detailed description of a preferred embodiment of the invention, this description being made in connection with the accompanying drawings forming a part of the specification.

In the drawings:

Figure 1 is an elevational view, partly diagrammatic, partly in section and with parts broken away and removed, of a high frequency electrical system incorporating a directional coupler embodying the principles of the present invention and constituting an insertion type wattmeter for use in a coaxial transmission line;

Fig. 2 is a transverse sectional view through the insertable transmission line, with parts removed, taken substantially along the line indicated at 2—2 of Fig. 1 to show an end elevation of the principal components of the present device;

Fig. 3 is a longitudinal sectional view, with parts broken away and removed, taken substantially along the axis of the transmission line as indicated at 3—3 of Fig. 2;

Fig. 4 is a plan view of the support mounted on the line, partly in section and with parts broken away and removed, taken substantially along the line indicated at 4—4 of Fig. 2;

Fig. 5 is a side elevational view of the detector cartridge or unit showing it removed from the support on the transmission line and reduced in size with respect to the preceding figures;

Fig. 6 is a fragmentary sectional detail, with parts removed, taken through the removable unit transverse to the rotational axis of the latter and through the support, this view being substantially along the line indicated at 6—6 of Fig. 3 and reduced with respect to that figure;

Fig. 7 is an expanded view showing in disassembled relation the several elements and components comprising the removable and rotatable detector unit or cartridge;

Fig. 8 is a transverse sectional detail of a subassembly of the removable unit taken diametrically through the conductive metal body, this view corresponding to Fig. 3 with respect to the relationship of the parts and being enlarged with respect to that figure;

Fig. 9 is another fragmentary sectional detail showing a more advanced subassembly obtained by the addition of elements and components to the subassembly of Fig. 8, this view being taken in an axial plane substantially along the line indicated at 9—9 of Fig. 3 and enlarged with respect to that figure;

Figure 10:
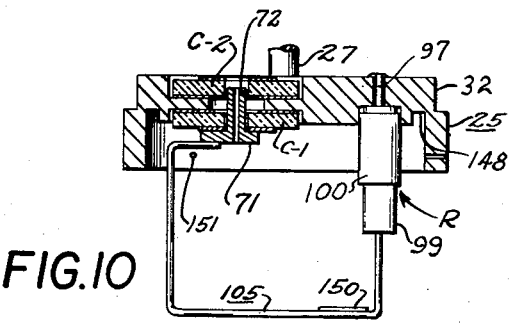
Fig. 10 is a transverse sectional view similar to Fig. 8 showing the base subassembly of a relatively sensitive modification for use at a relatively low power rating.
Figure 11:
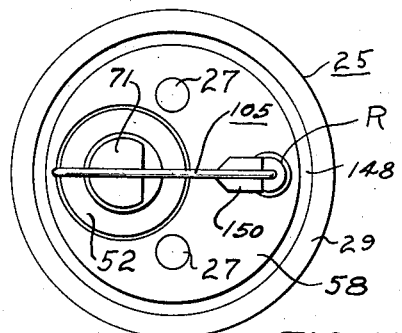
Fig. 11 is a bottom plan view of the base subassembly of Fig. 10.
Figure 12:
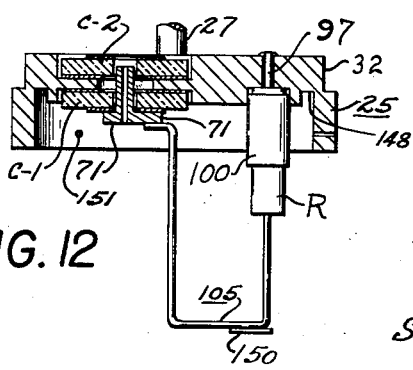
Fig. 12 is a transverse sectional view similar to Figs. 8 and 10 showing another base subassembly of a relatively insensitive pickup unit for use at a relatively high power rating.
Figure 13:
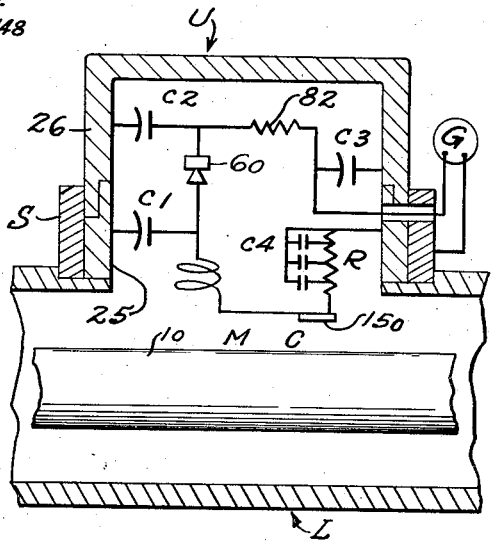
Figure 14:
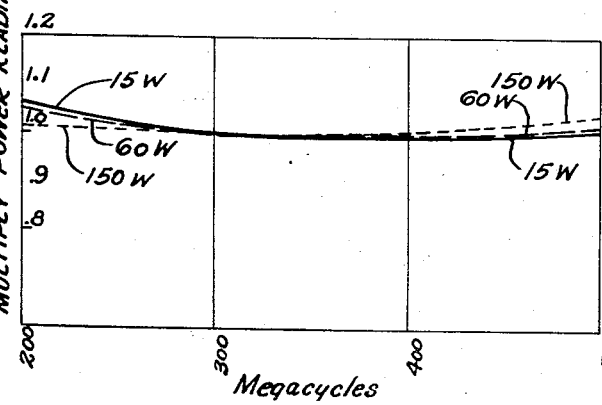

Fig. 13 is a diagrammatic representation of the system of the present invention showing the electrical relationship of the several parts and components of the present invention in schematic form; and Fig. 14 is a graph showing the response curves of the instrument over the band of frequencies from about 200 megacycles to about 500 megacycles, the curves representing the modifications in the loop circuit shown in Figs. 8, 10 and 12.

The directional coupler shown in the drawings as an illustrative embodiment of the present invention is part of a wattmeter intended for use as an insertion device to measure forward traveling and reflected wave signal energy on a coaxial transmission line. Included in the system or device are a number of subcombinations or subassemblies and structural features that are useful in other applications concerned with high frequency electrical energy. The pickup or coupler structure can, if desired, be mounted directly on a tubular transmission line formed with a suitable aperture to receive the sensing element or probe. It is preferable, however, to produce the system as an insertion device which can be incorporated in a high frequency electrical transmission line by means of conventional connectors or fittings.

As here shown the device or system includes a short section of transmission line L comprising a metal outer conductor 1 in the form of a cylindrical metal tube and a coaxial inner conductor 10. The tube has a smooth internal cylindrical surface 2 and at its ends is threaded internally at 3 to receive turned metal tubular fittings 4 and 5 for connection to conventional coaxial line cables or the like. The fitting 5 has a reduced diameter end which carries an internally threaded rotatable collar 6 for coupling to a suitable end fitting (not shown) on the end of one of the transmission lines between which the device is connected. The fitting 4 has an external thread 7 that receives a coupling collar similar to the collar 6 carried on the end of the other of the transmission lines.

Extending longitudinally through the tubular outer conductor 1 is the cylindrical metal inner conductor 10 supported at its ends by insulating annuluses 11 formed of suitable dielectric material such as polytetrafluoroethylene. The inner conductor is thus centered in the tubular outer conductor in coaxial relation and with the outer conductor 1 comprises a coaxial line section having a characteristic impedance corresponding to that of the coaxial transmission line in which the device or system is inserted. As here shown the characteristic impedance is approximately 50 ohms, the proportioning of the parts being conventional to obtain the desired impedance and to avoid objectionable reflections. For connection of the ends of the inner conductor 10 to the inner conductor ends of the transmission line in which the device is inserted, terminal rods, one of which is indicated at 12, are screwed into internally threaded axial sockets 14 in the ends of the inner conductor and are projected through the tubular end fittings 4 and 5 in coaxial relation. The terminal rods 12 are formed at their ends, one with a reduced diameter plug portion 15 and the other with an axially split tubular socket portion, to be received in and to receive complementally shaped terminal ends of the transmission line inner conductors. The tubular end fittings 4 and 5 are shaped, the former with a tapered socket 16 and the latter with an axially slotted tubular extension 17 to receive complementally shaped parts or fittings on the ends of the outer conductors of the coaxial transmission line in which the device or system is inserted. Insulating tubes 18 of suitable plastic material are received over the terminal rods 12 to separate the latter in the tubular end fittings 4 and 5.

A support S is mounted on the outside of the tubular ouer conductor 1 intermediate the ends of the latter, the support comprising a body block 20 of brass or similar conductive material suitably secured in place as by brazing or soldering. As shown in Fig. 2, the supporting block 20 is contoured to the cylindrical curvature of the external surface of the tubular conductor 1 so as to be received snugly against the latter. A cylindrical socket 21 in the block 20 receives a pluglike pickup unit U for facile removal and replacement, the pickup unit being rotatable in the suporting socket. At its inner end the cylindrical socket 21 is formed with a circular opening 22 which coincides with an opening 23 in the tubular line conductor 1. The openings 22 and 23 constitute an access aperture through which the sensing element of the pickup U is inserted into or subjected to the electrical field of the transmission line L.

The pickup unit U comprises an assembly of parts and components connected electrically to form part of a detector circuit. For convenience and simplicity the pickup unit is designed so that it can be built up from subassemblies in stages, thus facilitating manufacture. In thus providing a construction which is adaptable to the use of subassemblies in manufacture it is feasible to have the device assembled by relatively unskilled individuals who need not understand the theoretical considerations governing the design of high frequency equipment. By reason of the limited number of operations each performs the assemblers become adept and efficient in their particular tasks, thus obtaining accuracy and a high rate of production. The subassembly technique in manufacture also has inspection advantages which facilitate production control to maintain high standards of quality and precision.

The unit U comprises a base 25 and a cap 26 connected together by suitable means such as studs 27 and enclosing detector circuit components, including a plurality of thin, flat conducting and insulating elements interleaved in alternating relation. The base and cap are machined from brass or similar metal. Cylindrical outer surface 28 on the base 25 has a sliding fit in the support socket 21, the circular end of the base, indicated at 29, seating against circular locating shoulder 30 at the inner end of the socket in the support block 20, the locating shoulder surrounding the opening 22—23 into the line L.

The base member 25 and the cap member 26 are interfitted in telescopic relation, one of the members, preferably the base, having a reduced diameter portion 32 received within a tubular skirt portion 33 of the other member, here the cap. The external diameter of the cap skirt 33 is the same as that of the cylindrical surface 28 of the base to provide a continuous cylindrical surface over the major portion of the length of the removable detector unit so that the cap as well as the base has a sliding fit in the support socket 21 to guide and hold the pickup unit U in predetermined relation to the coaxial line section L, the axis of the unit being substantially normal to the longitudinal axis of the line, and to provide good electrical contact between the rotatable unit and the support S.

Stacked on the body 25 are the thin flat conducting and insulating elements previously referred to, including a conductive contact element or disc 35 and a conductive plate 36, each formed of suitable metal such as brass and respectively insulated from one another and the base 25 by circular insulating discs 37 and 38 formed of suitable dielectric material such as polytetrafluoroethylene. Surmounting the circular plate 36 is a circular insulating block 39 of polytetrafluoroethylene or other suitable plastic material, this block being used to mount a resilient contact and a charge resistor, as will later appear.

Stacked conductive elements 35, 36 and the insulating elements 37, 38 and 39 associated therewith are formed with aligned apertures to receive the spaced parallel studs 27 previously referred to. These studs are disposed in a diametrical plane of the pickup unit and are secured in the base 25 as by soldering or brazing. At their upper ends the studs are threaded to receive internally threaded headed sleeves 40 which extend through openings in knob portion 42 of the cap 26. The heads of the sleeves 40 are recessed in the cap knob 42 and extend into chamber 23 within the cap, where they engage the stud ends and by relative rotation draw the cap and base together so that end 44 of the cap skirt 33 is pressed firmly against circular shoulder 45 of the base 25.

Besides functioning as the connecting means holding the base and cap together, as previously described, the studs 27 serve to locate the conducting and insulating elements in assembly and to hold these parts or components together. Nuts 47 received on the threaded portions of the studs 27 bear against metal washers 48, which in turn bear against the insulating block 39 to compress the latter against the conductive plate 36, thereby compacting and confining the alternately arranged or interleaved conducting and insulating elements. The insulating block 39 is formed with counterbores 49 in the stud openings to accommodate the nuts and washers 47 and 48.

The base 25, grounded by direct electrical contact with the metal walls of the socket 21 in the support block 1, is electrically connected through the studs 27 to the metal plate 36. The contact disc 35, interleaved between the base and the plate, is, however, insulated from the grounded parts by the plastic dielectric discs 37 and 38 and by plastic insulating sleeves 50 which surround the studs 27 in the stud openings of the contact disc 35, the stud openings in the contact disc being larger than the studs to accommodate the insulating sleeves 50.

On opposite sides of the grounded base 25 are flat disc or button type capacitors 51 and 52, the latter constituting the capacitance C1 which tunes or resonates the loop circuit in the frequency band and at the sensitivity for which the particular pickup unit is designed. The loop circuit, thus heavily loaded by the capacitor C1, exhibits broad band characteristics by reason of the resistance R which flattens the response curve of the circuit. This capacitive loading of the resistive loop circuit by the series capacitor C1 is one of the distinguishing characteristics of the present invention and provides wide frequency band operation.

The capacitor 51 provides the capacitance C2 of the wiring diagram (Fig. 13) and is a so-called charge capacitor in the galvanometer circuit which, with the load resistor 82 provides the desired time constant to obtain peak reading characteristics in the galvanometer circuit.

Each of the capacitors 51 and 52 comprises a flat circular insulating disc 54 having on opposite flat faces armature elements 55 and 56 in the form of extremely thin metal such as silver leaf. The metal leaf elements of the capacitors 51 and 52, separated and insulated from one another by the discs 54, are fired in place or otherwise secured on the ceramic discs 54 and are bonded or adhere thereto with sufficient strength to permit soldering of the leaf armature elements to the other components of the detector circuit in the assembly of the unit. Each of the leaf armature elements 55 and 56 is annular in extent, surrounding a central opening 57 in the ceramic disc 54. The two capacitors are disposed in parallel planes with their central apertures in alignment. To obtain short connections between the components and also to aid the location of the capacitors in assembly the opposite faces of circular disc-like body 58 of the base 25 are formed with coaxial circular recesses having flat bottom faces 59. The metal leaf element or armature 56 of one of the capacitors is secured as by soldering to the recess face 59 on one side of the base body 58 while the corresponding element or armature of the other capacitor is similarly secured to the other recess face on the opposite side of the base body.

A crystal rectifier or diode 60 is connected across the armatures or silver leaf elements 55 of the capacitors 51 and 52. The rectifier used may be any one of several well known constructions, although the particular mounting and connecting arrangement employed and utilizing a diode having a conductive shell or casing is one of the advantageous features of the present invention. Suitable diodes or rectifiers are available commercially and, briefly described, comprise a pellet or crystal 61 of germanium or other semiconductor which is contacted by a whisker wire 62 of platinum, ruthenium or the like. The crystal and the whisker wire contactor are respectively mounted on the confronting ends of axially aligned rods 63 and 64, which constitute terminals for the rectifier. A protective sheath, here a conductive metal tube 65, surrounds the crystal, whisker wire, and the terminal rods. Suitable annular insulators 67 and 68 of glass or plastic material embrace the terminal rods to locate the latter in alignment and in coaxial relation to the tubular sheath 65. The annular insulators 67 and 68 seal the openings in the ends of the sheath and are spaced from one another by the provision of a central chamber in which the crystal and whisker wire are situated. The whisker wire is, of course, adjusted to a sensitive spot of the crystal or semiconductive pellet at the time of manufacture of the rectifier and the frictional grip of each insulator on the corresponding terminal rod retains the parts in adjusted relation.

The rectifier 60 is disposed in coaxial alignment with the central openings 57 in the insulating discs 54 of the capacitors. One of the rectifier terminals, say the terminal rod 64, extends axially through the aligned capacitor openings 57 and through an opening 70 in the base body 58, the opening 70 being continuous with the capacitor openings 57 and centralized in the circular recess 59 of the base body. A flat terminal disc 71 is soldered or otherwise secured and electrically connected to the leaf armature or element 55 of the capacitor 52, this terminal disc having an integral tubular stem 72 that extends axially through the opening 57 in the capacitor disc 54 and partially, but not completely, through the similar opening in the insulating disc of the capacitor 51. The axial terminal wire 64 of the rectifier 60 projects into the tubular stem 72 and is soldered in place.

In the manufacture of the disc or button capacitors 51 and 52 it is customary for the metal leaf element or armature on one side of the circular insulating disc 54 to extend to the outer margin of the disc and to have a central aperture or margin spaced from the disc aperture 57 (see armatures 56 of the capacitors), and for the leaf element or armature on the other side to have its outer margin or periphery spaced inwardly from the outer margin of the insulating disc 54 while having an inner margin or periphery which coincides with the insulator opening 57 (see armatures 55 of the capacitors). In assembling capacitors of the character mentioned, it is preferable to position the leaf elements or armatures 56 which extend to the outer peripheries of the insulators in confronting relation against the surfaces 59 of the body 58. In this manner the inner peripheries of the leaf elements or armatures 56, being spaced from the insulator apertures 57, are automatically removed from electrical connection or contact with the tubular stem 72 of the terminal disc which extends through the capacitor apertures.

Electrical contact between the leaf element or armature 55 of the capacitor 51 and both the tubular stem 72 of the terminal disc and the terminal rod 64 of the rectifier is avoided by dimensioning the tubular stem 72 so that it extends only partially through the aperture 57 of the insulator 54 of the capacitor 51. Thus the tubular stem 72 of the terminal disc functions as a locating spacer to hold the rectifier terminal 54 centralized in the capacitor aperture and out of contact with the inner margin or periphery of the leaf element or armature 55. The stem 72 thus serves to locate the rectifier terminal wire centrally through the apertures in the capacitors 51 and 52 in spaced insulated relation to the armature on the top face of the capacitor 51 and also serves in assembly to hold the rectifier in predetermined central or coaxial relation to the capacitors 51 to facilitate soldering of the tubular metal case or sleeve 65 of the rectifier to the metal leaf armature 55 of the capacitor, the solder being indicated at 73.

After the soldering of the subcombination or subassembly comprising the base 25, the capacitors 51 and 52, the rectifier 60, and the resistor R, to be later described, the studs 27 having been previously soldered into the diametrically located sockets 31 provided therefor in the base body 58, the insulating and conducting elements 35—39 are stacked on the base 25 in the alternating relation described. The preformed apertures in these elements receive the studs 27 to locate the elements in predetermined relation to one another and to the base. In this assembling operation the insulating sleeves 50 are positioned about the studs 27 and in the openings provided therefor in the contact disc 35. The peripheries of the alternating insulating and conducting elements, other than the contact disc 35 may be of substantially the same diameter, preferably the diameter of the cylindrical guide surface 32 on the base 25, the peripheries of the alternating elements being thus slidably received within the skirt 33 of the cap. Thus the alternating interleaved elements are physically and electrically shielded by the cap and the base and themselves constitute a pilot facilitating the telescopic assembly of the cap and the base. The insulating block 39 may have a circular periphery of slightly less diameter than the other stacked interleaved elements to permit a corresponding reduction in diameter of the internal chamber in the cap with a resultant thickening of the upper portion of the walls of the cap skirt. This thickened wall portion of the cap is drilled to provide a radial socket that receives an outwardly projecting radial stop pin 75 which locates the pickup unit in the cylindrical support socket 21, as will appear.

The contact disc 35, of less diameter than the insulating elements between which it is received, is formed with integral contact lugs 76 which project radially outwardly from the disc periphery.

The periphery of the contact disc is spaced inwardly from the peripheries of the insulating discs 37 and 38 and also from the cylindrical surface generated by the circular peripheries of the conductive plate 36 and the cylindrical surface of the reduced diameter body portion 32. In this manner the contact disc 35 while substantially surrounded by grounded conductive parts of the pickup unit is electrically insulated therefrom. The projecting lugs 76 are located on a diameter of the contact disc for making electrical contact with a contactor 77 carried by the support S at predetermined rotative positions 180° apart, as will later appear. To preserve the insulated condition and relation of the contact disc 35 the skirt 33 of the cap is formed with axial slots 78 into which the lugs 76 project. The radius of the outermost part or contact surface of each of the lugs 76 is less than the radius of the support socket 21 to provide insulating clearances between the contact lugs and the walls of the support socket when the pickup unit is placed in the support. The contact lugs preferably project beyond the cylindrical surfaces generated by the peripheries of the circular plate 36 and reduced diameter portion 32 of the base 25, the lugs being received in recesses in the walls of the cap skirt 33 defined by the axial slots 78. The relative positions of the telescoped base and cap may be maintained by frictional engagement between the cap skirt 33 and the cylindrical surface of the reduced diameter portion 32 of the base, the cap skirt being formed of resilient brass or similar metal and formed or sprung to a slightly smaller diameter than that of the telescoping surface of the base, so that in assembling the base is resiliently gripped by the skirt. If desired, the cap and skirt may be retained against relative rotation to prevent engagement between the contact lugs 76 and the walls of the skirt slot 78 by solder or radial pins, not shown.

In stacking the interleaved insulating and conducting elements on the base 25 the locating function performed by the spaced studs 27 automatically aligns the openings in the elements that receive the rectifier 60, the latter having been previously mounted on the base in the subassembly procedure described above. The upper end of the rectifier 60 is substantially flush with the upper surface of the circular insulating block 39, preferably projecting slightly above such surface to be engaged by a resilient metal spring contact 80. This spring contact is made of a strip of resilient electrical bronze or similar spring metal secured to the insulating block 39 by a screw 81 threaded into the block. The spring strip extends across the opening in the block through which the rectifier 60 projects and desirably is formed with a reverse bend to provide a turned under end portion which bridges the annular space between and electrically connects the terminal rod 63 and the tubular metal casing 65 of the rectifier. The spring strip 80 thus provides a conductive path across the upper end of the rectifier and connects the terminal 63 to the armature 55 of the charge capacitor 51 (capacitance C2) through the tubular metal casing 65.

In this compact arrangement of apertured capacitors combined with a rectifier in such a way that the apertures of the capacitors are on the axis defined by the terminal pins or rods of the rectifier there is obtained a structure having extremely short connections by means of which the rectifier terminals are each grounded through a capacitor. The spring contact 80, besides constituting a connector between the terminal rod 63 and the tubular metal sheath 65 of the rectifier, also supports and is connected to a load resistor 82 disposed in the chamber within the cap 26 of the plug unit. This load resistor is of conventional construction and may comprise a rodlike resistor body 83 of carbon or the like, a surrounding sleevelike insulator body 84 and terminal wires 85 and 86 which extend into the ends of or are otherwise electrically connected to the resistor rod 83. Terminal wire 85 is fastened as by solder and electrically connected to an upstanding ear 87 formed on the spring contact 80. The terminal wire 86 is similarly secured to one or the upper end of a wire 88 which parallels the axis of the plug or pickup unit, extends through the passage in the insulating block 39, through center eyelet 89 of a flat circular button type isolation or by-pass capacitor C–3, through an opening in the flat insulating element 37 and into a drill hole in the contact disc 35. The other or lower end of the wire 88 is soldered in the contact disc, to which it is thus secured and electrically connected. The wire 88 is also soldered to the capacitor eyelet 89.

Peripheral ring or contactor 90 of the capacitor C–3 is soldered or otherwise secured to the grounded block member or plate 36 in such a way as to hold the center eyelet 89 out of contact with the grounded member. The preferred arrangement is obtained by forming a recess 92 in one, preferably the upper, face of the brass ground plate, the recess being circular in plan form and of such size as to receive the circular rim of the button capacitor C–3 in an easy press fit, the capacitor rim or peripheral contact being soldered to the walls of the recess. A passage 93 through the plate 36 and centered on the axis of the recess 92 is sufficiently large to avoid contact with the center eyelet of the capacitor and the conductor wire 88.

Thus the conductor wire 88, electrically connected to the contact disc 35, passes through the grounded plate 36 in insulated relation, being connected to the plate through the capacitor 3–C which thus serves to isolate the internal portions of the detector circuit and constitutes a pass to ground for high frequency currents within the unit to protect the externally located indicator or galvanometer G from the high frequency energy. This galvanometer G is a conventional indicator and may be of the D'Arsonval type. Its internal resistance plus the resistance of the load resistor 82 is sufficiently high to keep the current in the detector or pickup circuit at a sufficiently low level to avoid injury to the rectifier R. With rectifiers presently available it is preferable to keep voltage across the crystal diode or rectifier to 1.5 volts or less, the load resistor 82 being selected by Ohm's low principles so that in conjunction with the internal resistance of the galvanometer the voltage across the crystal is held within the desired limits. In practice the load resistor 82 is in the range of from 2,000 to about 10,000 ohms and the galvanometer responds as a peak reading instrument by reason of the RC time constant of the circuit.

On the end of the pickup unit which is disposed toward the line opening 23 is a component which senses or samples high frequency wave signal energy on the transmission line. This component includes the terminal disc 71, a resistor R, and a wire loop or conductor 105 connected between the terminal disc and one terminal wire 96 of the resistor. The resistor R has another terminal wire 97 which is soldered in a hole formed through the body 58 on the base 25. The resistor R is of similar construction to the rectifier load resistor 82, though of much lower value (about 50 to about 120 ohms). It includes a carbon rod resistive body 98 to the ends of which the terminal wires 96 and 97 are connected as by being embedded therein or otherwise, and a surrounding insulating sheath or tube 99 of suitable dielectric material. Surrounding the resistor R and insulated from the resistive carbon rod 98 by the insulating sheath 99 is a metal sleeve 100. This sleeve and the resistor R comprise a capacitor C–4 which functions to modify the loop-resistor circuit and obtain several beneficial results, chiefly improved directivity characteristics, but also so-called "flat" response over a wide frequency band. The effective length of the conductive sleeve or cylindrical capacitor armature 100 is adjustable in assembly with respect to the resistor R, adjustment being effected by sliding the sleeve 100 along the length of the resistor, one end of the sleeve 100 being telescoped to a variable depth in a mating cylindrical socket 101 in the body 58 of the unit base. The socket also receives one end of the resistor R and has cylindrical walls concentric to the hole in which the resistor wire 97 is soldered. When the desired position of adjustment of the sleeve 100 is determined the end thereof is soldered to the cylindrical walls of the socket 101. Placing the modifying capacitance C–4 across the resistor R of the loop-resistor sensing combination in the manner described distributes the capacitance along the length of the resistor and has the effect of improving the balance and directivity of the instrument. With this arrangement a directivity of over 40 decibels is obtained in the instrument described over a wide frequency range having a ratio of at least 2½ to 1 and having satisfactory directivity over even wider frequency ranges, as wide as 5 to 1 ratio being possible, whereas the same instrument without the modifying capacitor has less than about 25–35 decibels of directivity over the same range of frequencies. In the use of a cylindrical tube as one armature of the capacitor providing the capacitance C–4, the latter is distributed along the length of the resistor and is open at the end toward the loop.

The wire inductor or loop 105 is connected between and supported by the terminal disc 71 and the terminal wire 96 of the resistor R. This element of the sampling component is formed of copper and comprises a substantially straight portion 106, oriented to parallel the axis of the transmission line (thus parallelling inner conductor 10 of the latter) and a radial connecting portion 107 which joins the terminal disc 71 to one end of the straight portion 106. The other end of the latter is soldered to the end of the terminal wire 96 of the resistor R. The connecting portion 107 may optionally include a coil portion 108, the length of the coil being determined by the frequency band and power range of the instrument and the coil being preferably formed on the end of connecting wire portion 107 closely adjacent the terminal disc 71.

The removable pickup unit U is rotatable in the socket 21 of the support S, as previously mentioned, this rotative movement swinging the components of the pickup circuit, including the inductor element 105, bodily about an axis normal to the transmission line axis.

When the pickup unit is oriented in the socket as shown in Fig. 3, with respect to wave signal energy traveling from left to right in that figure the current induced in the loop or inductive sensing element 105 is additive to that induced in the sampling circuit by the capacitive coupling (C) between such circuit and the transmission line. Thus is obtained maximum response by the indicating galvanometer G. With respect to wave signal energy traveling from right to left the current resulting from the inductive coupling of the loop sensing element is subtractive from that induced by the capacitive coupling and the galvanometer responds as a null or minimum. Rotation of the pickup unit to its other or 180° displaced position relative to the line has the effect of reversing the response of the indicating galvanometer to obtain a maximum reading from wave signal energy traveling right to left and a minimum or null reading from such energy traveling left to right.

The rotative or angular movement of the pickup in the support is limited by a pin 110 soldered or press fitted in a drill hole in the cap 26 and projecting radially from the latter.

Shown in Fig. 1, one end of the support block 20 is relieved or cut away about the socket 21 of the pickup unit to accommodate the stop pin 110 of the latter and permit such pin to swing through its arc of 180°. The turning movement of the pickup unit in the support socket may be limited by engagement of the stop pins 110 against shoulders 116 on the support block 20 at the ends of the relieved or cut away portion that accommodates the stop pin 110. Preferably, however, provision is made for varying or adjusting the limits of rotative movement of the pickup unit as by means of adjustable slide stops 109 of brass or steel. These stops are each L-shaped and are disposed flatwise against opposite sides of the support block 20 in shallow recesses 111 formed as by routing in opposite sides of the block. Each recess is generally below and to one side of the cutout in the block that accommodates the stop pin 110. Each of the stops has an upstanding leg portion which projects into the path of the stop pin 110 and is engaged by the latter at its limit of movement in one direction, the other leg of the stop being longitudinally slidable in the recess 111 along shoulder 115 which defines the recess. Screws 112 received through elongated slots 114 in the stops 109 secure the latter to the support block while permitting, when loosened, limited adjustment of the stops in the recesses 111. Shoulders 115 defining the sides of the recesses 111 serve as guides for the sliding movement of the stops, the latter having straight edges movable along the shoulders in the adjustment of the stops to the desired positions in the recesses. In original assembly the adjustment is effected so that when the pin 110 is engaged by either of the two stops the straight portion 106 of the inductive element 105 parallels the axis of the inner line conductor 10, the two positions of the pickup unit being 180° apart.

On the top of the support body 20 is a swingable latch member 120 carried by a pivot bolt 121 which extends through an opening 122 in the support block for free endwise sliding movement. The pivot bolt extends into a recess or chamber 123 in the support body 20 and receives a helical coil compression spring 124 which surrounds the shank of the bolt and is compressed between washers 125 and 126, the latter being retained on the bolt by a friction head nut 127. The spring 124 biases the bolt axially so that the head of the bolt draws the latch member 120 resiliently and yieldingly toward flat top face 128 of the support block.

The axis of the pivot bolt 121 parallels the rotational axis of the pickup unit U, the top face 128 of the support block being normal to these axes. Thus the latch member 120 is swingable in a plane normal to the pickup unit axis into and out of an annular recess 129 in the pickup unit cap 26. One or the lower side of the annular recess 129 is defined by a circular radial shoulder 130 which projects slightly above the top surface 128 of the support body when the pickup unit U is bottomed in the socket 21 with the lower end of the unit base 25 bearing against the socket shoulder 30. In swinging the latch 120 onto the shoulder 130 of the pickup unit, this movement being facilitated by a rounded edge corner 131 on the shoulder, the latch is raised slightly off the block surface 128 against the force of the compressed spring 124. Thus the spring, acting through the latch 120, maintains continuous yielding pressure against the shoulder 130 of the pickup unit U to urge the latter axially in the socket 21 and thereby to maintain the circular end edge 29 of the base 25 against the circular shoulder 30 at the bottom of the socket to maintain complete circular electrical contact between the parts at and about the opening into the coaxial transmission line.

To faciliate shifting of the latch member 120 between the pickup retaining position, shown in full lines in Fig. 4, and the retracted position, shown in broken lines in the same figure, an upstanding ear 132 is formed on or attached to the latch member. A ball detent 134 is held captive in a recess in the block surface 128, the ball being engageable in one of two recesses in the underside of the latch member 120 to retain the latter in either of the two positions shown.

The contact plate or disc 35, insulated from the ground parts of the pickup unit, constitutes a conductor and terminal for direct current to the indicator or external galvanometer G from the detector circuit components housed by and between the cap and base of the pickup unit. The electrical contactor 77 for engaging either one of the contact legs 76 on the contact disc 35 is carried on the end of a bronze or other spring metal arm 136 which is secured to and extends as an axial continuation of a center terminal pin 137 of a coaxial cable fitting. This fitting includes a turned body 138 of brass or similar metal soldered to the body 20 in counterbore 139 of lateral bore 140 which receives the contactor 77 and the mounting spring 136 which support the latter. The center terminal 137, also of brass or like conductive metal, is press fitted in an insulating annulus 14, in turn press fitted into the center bore of the fitting body 138.

The two terminals of the galvanometer G are connected to the insulated center terminal 137 and to the turned body 138 of the cable fitting on the support S as by a conventional flexible coaxial cable 142 which comprises conductors 143 and 144. These conductors, one the center conductor and the other the flexible sheath of the cable 142, terminate in a conventional cable fitting 145 which includes the usual components complementary to the center terminal 137 and the turned body 138 of the support for electrically connecting the cable conductors 144 and 143 to the center terminal and turned body, respectively. Knurled collar 146 of the cable end fitting 145 is received on threads 147 of the turned fitting body 138 to hold the parts together in the usual manner.

Received telescopically within the open ended cylindrical skirt of the base 25 is the cylindrical rim of a plastic cup 147 of suitable dielectric material such as polytetrafluoroethylene. This cup defines a chamber for the sensing loop, resistor and related elements of the pickup circuit and projects radially into the annular dielectric space of the line L through the opening 22—23. The rim edge of the cup is received in an internal annular channel 148 in the base 25 of the unit and radial pins 149 through aligned openings 151 in the base and the cup retain the latter assembled to the base. This cup protects the delicate parts of the pickup unit and keeps them relatively free of dirt and moisture.

The transmission line component L may thus be inserted in a coaxial transmission line and the galvanometer G located in a convenient remote position, there being no requirement for disturbing or removing the connecting cable 142 when once the line component L is inserted in the transmission line. The pickup unit U is rotatable while held in the support socket 21 by the yielding pressure of the latch member 120 so that the instrument, set for response to wave signals traveling in one direction on the coaxial line is readily altered for response to wave signals traveling in the other direction. In shifting the pickup unit between its 180° positions as determined by the stop pin 110 and the stops 109 there is no disturbance to the cable 142 connecting the pickup to the indicator or galvanometer G.

The arrangement provided by the present invention permits the pickup unit U to be released by shifting the latch member 120 to its retracted position for bodily withdrawal of the pickup unit and replacement by another or substitute pickup unit having a different power rating or other characteristics or adapted for use over a different frequency band or range. This removal and substitution or replacement of the pickup unit is accomplished without disturbing or disconnecting the connecting cable between the support S and the indicator or galvanometer G. It is thus feasible to supply for installation or insertion in a coaxial transmission line an instrument or system having a plurality of interchangeable pickup units adapted for use at different power levels or over different frequency ranges in overlapping relation. By simple substitution of pickup units the instrument is modified for optimum use at any power over any desired frequency band or range. The substitution is readily effected without disturbance to the indicator or galvanometer circuit and without any necessity for parting or connecting cables or conductors, the mere plugging in or unplugging of the pickup unit U automatically making or breaking the connection between the detector circuit carried by the pickup unit and bodily shiftable therewith and the external relatively fixed circuit of the indicator or galvanometer.

Adaptation of the invention to the design of plug in pickup units for use at different power ratings and over different frequency bands is illustrated in the drawings which show, in Fig. 3, an arrangement of the loop or inductive sensing element 105 to include the coil portion 108 closely adjacent the body 58 of the plug in base 25. The coil 108 provides self inductance in the loop-resistor circuit (as distinguished from the mutual inductance between the loop and the line) so that resonance of the loop circuit, including the resonating capacitor C1, may be obtained over a relatively low frequency band, say from about 20 to about 50 megacycles per second. Sensitivity of the instrument, as to provide for different power ratings, is varied by movement of the loop 105 relatively toward or away from the inner conductor 10 of the line. Shifting the loop, particularly the straight portion 106, toward the inner conductor increases the sensitivity, say for use in a relatively low power meter. Shifting away from the inner conductor decreases the sensitivity, say for use in a relatively high power meter.

Modifications of the basic structure in adapting the meter to different power ranges are illustrated in Figs. 8, 10, and 12 which are the base subassemblies for plug in units to be used when full scale deflection of the galvanometer G is desired at 60, 15 and 150 watts, respectively, over a 2½ to 1 frequency band of from about 200 to about 500 megacycles. In these units satisfactory results are obtained using crystal rectifiers 60 commercially available as Raytheon CK 710. The isolation or by-pass capacitor C-3, which restricts the high frequency energy to the pickup unit while permitting the D. C. to be got out to the galvanometer, is about 500 mmf. while the charge capacitor C-2 (51) is of the order of about 100 mmf.

In the selection of the resistor R of the loop-resistor combination and the supplemental or compensating resistor C-1 for these several units empirical methods must be used in conjunction with calculations to satisfy the requirements of Equation 4. The compensating capacitor C-1 is not the "C" of this equation but must be chosen in relation to the components concerned in Equation 4 to obtain the desired "flat" response of the meter over a wide frequency band. The resistor R may be an Ohmite or Allen Bradley 82 ohm resistor of ½ watt rating and the loop 105 may be formed of .032" diameter tinned copper wire such as is used as the terminal lead of the resistor mentioned. The free end of this lead wire is soldered to the terminal disc 71, the other end being connected to the terminal of the resistor. The coil portion 108 is omitted from the loop for the frequency ranges mentioned.

A wattmeter having the components mentioned provides full scale deflection of the indicating galvanometer G at 60 watts when the straight portion 106 of the loop, which portion parallels the inner conductor 10 of the coaxial line at a spacing or distance of about .126", is about .375" in length and is located at about .425" from the bottom surface of the body 58 of the base. The loop circuit described for the 60 watt power range is balanced or resonated in the 200 to 500 megacycle frequency band with a resonating capacitor C1 of about 30 mmf. and obtains a response substantially flat over the designed frequency band as indicated by curve 60w (Fig. 14).

The range of the meter can be varied by changing the dimensions and location of the straight portion 106 of the loop 105. An increase in the length of the straight portion 106 of the loop to about .675" and shifting of such portion toward the inner conductor of the line about .044" to a spacing from the latter of about .082" results in full scale deflection of the galvanometer at about 15 watts. Resonation of the loop circuit for this 15 watt meter in the frequency band mentioned is obtained with a capacitor C1 of about 20 mmf. The response of this meter arrangement is indicated by curve 15w (Fig. 14).

A decrease in length of the straight portion 106 of the loop to about .225" and shifting of such portion away from the inner conductor 10 to a spacing of about .176" increases the meter range to 150 watts full scale. Resonation of the 150 watt loop circuit is obtained by a capacitor C1 of about 40 mmf. Curve 150w of Fig. 14 indicates the response of the 150 watt meter.

In balancing Equation 4 the size or diameter of the wire comprising the loop 105 is an influencing factor. Increasing the wire size increases capacitance C between the loop and the inner conductor 10 of the transmission line, whereas decreasing the wire size decreases such capacitance, the mutual inductance M remaining substantially the same. If desired, a plate 150 of suitable area may be soldered to the straight portion 106 of the loop wire in a plane parallel to the axis of the line to increase the capacitance coupling. The capacitance C-1 is found to vary in the range of from about 10 mmf. to about 50 mmf., depending upon factors such as the characteristics of the particular resistor R, the geometry of the loop 105 and the frequency range in which the meter is to be used. In the examples mentioned Centralab ceramic blank capacitors are employed.

The present invention thus provides numerous structural advantages and improved operating characteristics in meters for high frequency electrical wave signal energy of the type that are mounted on or inserted in coaxial transmission lines to obtain continuous monitoring of the transmitted power. The features of pickup unit removability and rotatability permits the use of interchangeable units for use at different power ratings and over different frequency ranges in instruments of the directional coupler type. The removal and replacement of the pickup unit is facilitated by the provision of automatic depth positioning in the support socket, of locating stops for rotative positioning, and by the arrangement for automatic connection of the pickup unit to both the transmission line and the external galvanometer. Since the connection of the pickup unit to the galvanometer is through the support that is permanently mounted on the transmission line, the pickup unit is not captive to the system of the external galvanometer and can be readily removed and replaced.

In accordance with the patent statutes the principles of the present invention may be utilized in various ways, numerous modifications and alterations being contemplated, substitution of parts and changes in construction being resorted to as desired, it being understood that the embodiments shown in the drawings and described above and the particular method set forth are given merely for purposes of explanation and illustration without intending to limit the scope of the claim to the specific details disclosed.

What we claim and desire to secure by Letters Patent of the United States is:

1. In a high frequency electrical system for detecting wave signals on a transmission line having a tubular conductor, said system being of the type comprising an indicator and detector circuit means providing coupling between the indicator and the line, the improvement in the detector circuit means which comprises in combination a support adapted to be mounted on the tubular conductor and a pickup detector unit carried by the support for facile removal and replacement, the pickup detector unit and the support being formed complementally as a plug and socket combination including locating means for positioning the unit in predetermined relation to the support in assembly, the unit comprising a hollow conductive body, electrical elements connected together in a detector circuit, some of said elements being carried by the body and including a projecting sensing element, the sensing element upon positioning of the unit in said predetermined relation being located in the electrical field of wave signal energy on the line, a contact carried by the body in insulated relation and electrically connected to the detector circuit, and terminal means carried by the support for connection thereto of electrical conductor means to the indicator, said terminal means and the contact being arranged automatically to connect an indicator so connected to the detector circuit whereby removal and replacement of the pickup unit may be effected independently of the indicator and the connecting conducting means to the latter.

2. In a high frequency electrical system for detecting wave signals on a transmission line having a tubular conductor, said system being of the type comprising an indicator and detector circuit means providing coupling between the indicator and the line, the improvement in the detector circuit means which comprises in combination a support adapted to be mounted on the tubular conductor and a pickup detector unit carried by the support for facile removal and replacement, the pickup detector unit and the support being formed complementally as a plug and socket combination including locating means for positioning the unit in predetermined relation to the support in assembly, the unit comprising a hollow conductive body, a rectifier in and shielded by the body, a sensing element projecting from one end of the body and electrically connected to the rectifier, the sensing element upon positioning of the unit in said predetermined relation being located in the electrical field of wave signal energy on the line, a contact carried by the body in insulated relation and electrically connected to the rectifier, capacitor means housed within the body and electrically connected in the detector circuit of the pickup unit and including a by-pass capacitor between the body and the contact, and terminal means carried by the support for connection thereto of electrical conductor means to the indicator, said terminal means and the contact being arranged automatically to connect an indicator so connected to the detector circuit, high frequency wave signals in the pickup unit being isolated from the indicator by the by-pass capacitor, whereby removal and replacement of the pickup unit may be effected independently of the indicator and the connecting conductor means to the latter.

3. In a high frequency electrical system for detecting wave signals on a transmission line having a tubular conductor, said system being of the type comprising an indicator and detector circuit means providing coupling between the indicator and the line, the improvement in the detector circuit means which comprises in combination a support adapted to be mounted on the tubular conductor and a pickup detector unit carried by the support for facile removal and replacement, the pickup detector unit and the support being formed complementally as a plug and socket combination in which the unit is received slidably in the support for movement radially with respect to a transmission line conductor mounting the support, locating shoulder means limiting the sliding movement to position the unit in predetermined relation to the support in assembly, resilient means acting between the unit and the support and biasing the unit to bear radially against the shoulder means, the unit comprising a hollow conductive body, a rectifier in and shielded by the body, a sensing element projecting from one end of the body and electrically connected to the rectifier, the sensing element upon positioning of the unit in said predetermined relation being located in the electrical field of wave signal energy on the line, a contact carried by the body in insulated relation and electrically connected to the rectifier, capacitor means housed within the body and electrically connected in the detector circuit of the pickup unit and including a by-pass capacitor between the body and the contact, and terminal means carried by the support for connection thereto of electrical conductor means to the indicator, said terminal means and the contact being arranged automatically to connect an indicator so connected to the detector circuit, high frequency wave signals in the pickup unit being isolated from the indicator by the by-pass capacitor, whereby removal and replacement of the pickup unit may be effected independently of the indicator and the connecting conductor means to the latter.

4. In a high frequency electrical system for detecting wave signals on a transmission line having a tubular conductor, said system being of the type comprising an indicator and detector circuit means providing coupling between the indicator and the line, the improvement in the detector circuit means which comprises in combination a support adapted to be mounted on the tubular conductor and a pickup detector unit carried by the support for facile removal and replacement, the pickup detector unit and the support being formed complementally as a plug and socket combination in which the unit is received slidably in the support for movement radially with respect to a transmission line conductor mounting the support, locating shoulder means limiting the sliding movement to position the unit in predetermined relation to the support in assembly, a latch and means pivoting the latch on the support for swinging movement between a retracted position for removal and replacement of the pickup unit and a position in which the positioned unit is engaged by the latch and held in said predetermined relation, the unit comprising a hollow conductive body, a rectifier in and shielded by the body, a sensing element projecting from one end of the body and electrically connected to the rectifier, the sensing element upon positioning of the unit in said predetermined relation being located in the electrical field of wave signal energy on the line, a contact carried by the body in insulated relation and electrically connected to the rectifier, capacitor means housed within the body and electrically connected in the detector circuit of the pickup unit and including a by-pass capacitor between the body and the contact, and terminal means carried by the support for connection thereto of electrical conductor means to the indicator, said terminal means and the contact being arranged automatically to connect an indicator so connected to the detector circuit, high frequency wave signals in the pickup unit being isolated from the indicator by the by-pass capacitor, whereby removal and replacement of the pickup unit may be effected independently of the indicator and the connecting conductor means to the latter.

5. In a high frequency electrical system for detecting wave signals on a transmission line having a tubular conductor, said system being of the type comprising an indicator and detector circuit means providing directional coupling between the indicator and the line, the improvement which comprises in combination a support adapted to be mounted on the tubular conductor and a pickup unit carried by the support for relative rotation, the support having terminal means for connection of electrical conductor means to the indicator, the pickup unit including a conductive body carrying insulated electrical contacts equidistant from the rotational axis of the unit and angularly separated from one another about such axis, and means automatically effecting electrical connection between the terminal means and one of the contacts upon selective rotation of the pickup unit to one of several predetermined positions relative to the support whereby the pickup unit can be selectively oriented to provide coupling of the detector circuit to the line in different directions independently of the electrical conductor means connecting the detector circuit to the indicator.

6. In a high frequency electrical system for detecting wave signals on a transmission line having a tubular conductor, said system being of the type comprising an indicator and detector circuit means providing coupling between the indicator and the line, the improvement in the detector circuit means which comprises in combination a support adapted to be mounted on the tubular conductor and a pickup detector unit carried by the support for facile removal and replacement, the pickup detector unit and the support being formed complementally as a plug and socket combination including locating means for positioning the unit in predetermined relation to the support in assembly, said unit comprising a base having on one side a plurality of relatively thin flat conducting and insulating elements stacked in alternating relation and formed with through openings in the provision of a rectifier recess, a rectifier in said recess and disposed wholly on said one side of the base, a resistor on the other side of the base and wholly supported thereby, circuit components including said rectifier and said resistor connected together in a pickup network, said network being connected to a conductive one of the elements and to the base whereby the one element and the base constitute network terminals for connection of the network to an indicator, and conductor means carried by the support block for contacting the conductive element and connecting the latter to the indicator.

7. In a high frequency electrical system for detecting wave signals on a transmission line having a tubular conductor, said system being of the type comprising an indicator and detector circuit means providing coupling between the indicator and the line, the improvement in the detector circuit means which comprises in combination a support adapted to be mounted on the tubular conductor and a pickup detector unit carried by the support for facile removal and replacement, the pickup detector unit and the support being formed complementally as a plug and socket combination including locating means for positioning the unit in predetermined relation to the support in assembly, said unit comprising a base, stud means on the base, a plurality of relatively thin flat conducting and insulating elements received on the stud means and stacked on one side of the base in alternating relation, said elements being formed with aligned openings in the provision of a rectifier recess continuous through the elements, a rectifier in said recess and disposed wholly on said one side of the base, a resistor on the other side of the base and wholly supported thereby, circuit components including said rectifier and said resistor connected together in a pickup network, said network being connected to a conductive one of the elements and to the base whereby the one element and the base constitute network terminals for connection of the network to an indicator, and conductor means carried by the support block for contacting the conductive element and connecting the latter to the indicator.

8. A pickup network unit for attachment to the tubular conductor of a high frequency electrical line to couple an indicator to such line, said unit comprising a conductive base, a conductive cap, a fastener extending between the base and the cap, a plurality of insulating and conducting elements interposed between the base and cap in alternating relation, said elements each having a plurality of through openings aligned with corresponding openings in the others of the elements in the provision of a fastener passage and a recess for accommodating an electrical component, the fastener extending through the fastener passage in the alternated elements, circuit components including rectifier means, said rectifier means being disposed in said recess, capacitor means and resistor means carried by the base, shielded by the base and the cap and connected together in a pickup circuit, said circuit being connected to a conductive one of the interposed elements and to the base whereby the one element and the base constitute circuit terminals for connection of the circuit to an indicator.

9. A pickup network unit for attachment to the tubular conductor of a high frequency electrical line to couple an indicator to such line, said unit comprising a conductive base, and a conductive cap telescoped one within the other and having confronting faces generally normal to the telescoping axis, a plurality of insulating and conducting elements interposed between the base and cap in alternating relation, said elements being formed with aligned openings providing a recess for accommodating an electrical component, circuit components including rectifier means, said rectifier means being disposed in said recess, capacitor means and resistor means carried by the base, shielded by the base and the cap and connected together in a pickup circuit, said circuit being connected to a conductive one of the interposed elements and to the base whereby the one element and the base constitute circuit terminals for connection of the circuit to an indicator.

10. A pickup network for attachment to the tubular conductor of a high frequency electrical line to couple an indicator to such line, said unit comprising a conductive base, a plurality of relatively thin flat conducting and insulating elements stacked on the base in alternating relation and formed with aligned through openings in the provision of a rectifier recess, a rectifier in said recess, conductive means extending through the stacked elements and fast to the base, said conductive means securing such elements together and to the base, circuit components including said rectifier connected together in a pickup network, said conductive securing means comprising an electrical connection between one of the conductive elements and the base, another of the conductive elements located intermediate the one conductive element and the base comprising a terminal and being insulated from the conductive securing means, and said network being connected to the terminal element and to the base whereby the terminal element and the base constitute network terminals for connection of the network to an indicator.

11. A high frequency electrical device for measuring wave signals on a transmission line having coaxially arranged inner and outer conductors, said device comprising an indicator, a conductive metal body, means for receiving the body and supporting the latter on the outer conductor of the line to rotate about an axis substantially normal to the line axis, said body including an apertured partition disposed in a plane substantially normal to the rotational axis of the body, capacitors one on each side of said partition and each having a terminal connected directly to the partition, a resistor on one side of the partition, said resistor having a terminal connected to the partition, a rectifier on the other side of the partition, one terminal of the rectifier being connected to another terminal of the capacitor on said other side of the partition, the other terminal of the rectifier being connected to another terminal of the capacitor on said one side of the partition, and circuit means connecting the indicator to the rectifier, said circuit means including a loop connected between said other terminal of the rectifier and another terminal of the resistor, said loop being disposed to provide directional reactive coupling between the line and said circuit means whereby in one position of the body relative to the line the indicator responds to wave signal energy traveling in one direction on the line and in another relative position responds to wave signal energy traveling in the other direction on the line.

12. A high frequency electrical device for measuring wave signals on a transmission line having coaxially arranged inner and outer conductors, said device comprising an indicator, a conductive metal body, means for receiving the body and supporting the latter on the outer conductor of the line to rotate about an axis substantially normal to the line axis, said body including an apertured partition disposed in a plane substantially normal to the rotational axis of the body, a pair of capacitors disposed one on each side of the partition, said capacitors each comprising a flat insulator and plate elements on opposite sides of the insulator, the plate elements constituting capacitor terminals, one such terminal of each capacitor being connected to the metal body, a resistor on one side of the partition, said resistor having a terminal connected to the partition, a rectifier on the other side of the partition, one terminal of the rectifier being connected to another terminal of the capacitor on said other side of the partition, the other terminal of the rectifier being connected to another terminal of the capacitor on said one side of the partition, and circuit means connecting the indicator to the rectifier, said circuit means including a loop connected between said other terminal of the rectifier and another terminal of the resistor, said loop being disposed to provide directional reactive coupling between the line and said circuit means whereby in one position of the body relative to the line the indicator responds to wave signal energy traveling in one direction on the line and in another relative position responds to wave signal energy traveling in the other direction on the line.

13. A high frequency electrical device for measuring wave signals on a transmission line having coaxially arranged inner and outer conductors, said device comprising an indicator, a conductive metal body, means for receiving the body and supporting the latter on the outer conductor of the line to rotate about an axis substantially normal to the line axis, said body including an apertured partition disposed in a plane substantially normal to the rotational axis of the body, capacitor elements disposed one on each side of the partition and each providing capacitive coupling to the partition, a resistor on one side of the partition, said resistor having a terminal connected to the partition, a rectifier on the other side of the partition, one terminal of the rectifier being connected to the capacitor element on said other side of the partition to be thereby capacitively coupled to such partition, the other terminal of the rectifier being connected to the capacitor element on said one side of the partition, and circuit means connecting the indicator to the rectifier, said circuit means including a loop connected between said other terminal of the rectifier and another terminal of the resistor, said loop being disposed to provide directional reactive coupling between the line and said circuit means whereby in one position of the body relative to the line the indicator responds to wave signal energy traveling in one direction on the line and in another relative position responds to wave signal energy traveling in the other direction on the line.

14. In a high frequency electrical device for measuring wave signals on a coaxial transmission line, said device being of the type comprising an indicator and detector circuit, means providing coupling between the line and the indicator, the improvement in said circuit means comprising the combination of a rectifier having a tubular conductive sheath and at one end a central terminal coaxial to the sheath, the sheath comprising the other terminal of the rectifier, a charge capacitor and a resonance capacitor, said capacitors each comprising a substantially flat conductive element and an insulator carrying such element, conductive body means supporting the insulators in spaced relation with the conductive elements substantially parallel, means electrically connecting and physically uniting the sheath terminal of the rectifier to the conductive element of one capacitor to mount the rectifier on the one capacitor in insulated relation to the body means and to capacitively couple the rectifier sheath terminal to the body means, and means connecting the central terminal of the rectifier to the conductive element of the other capacitor whereby to capacitively couple the central terminal of the rectifier to the body means.

15. In a high frequency electrical device for measuring wave signals on a coaxial transmission line, said device being of the type comprising an indicator and detector circuit, means providing coupling between the line and the indicator, the improvement in said circuit means comprising the combination of a rectifier having a tubular conductive sheath and at one end a central terminal coaxial to the sheath, the sheath comprising the other terminal of the rectifier, a charge capacitor and a resonance capacitor, said capacitors each comprising a substantially flat conductive element and an insulator carrying such element, conductive body means supporting the insulators in spaced relation with the conductive elements substantially parallel, means electrically connecting and physically uniting the sheath terminal of the rectifier to the conductive element of one capacitor to mount the rectifier on the one capacitor in insulated relation to the body means and to capacitively couple the rectifier sheath terminal to the body means, and said central terminal of the rectifier extending through said conductive element of said one capacitor in insulated relation and being electrically united to the conductive element of the other capacitor whereby to capacitively couple the central terminal of the rectifier to the body means.

16. In a high frequency electrical device for measuring wave signals on a coaxial transmission line, said device being of the type comprising an indicator and detector circuit, means providing coupling between the line and the indicator, the improvement in said circuit means comprising the combination of a rectifier having a tubular conductive sheath and at one end a central terminal coaxial to the sheath, the sheath comprising the other terminal of the rectifier, a charge capacitor and a resonance capacitor, conductive body means between and supporting the capacitors, said capacitors each comprising a substantially flat insulator formed with a central aperture and having on one side a flat conductive element surrounding the aperture, means electrically connecting and physically uniting the sheath terminal of the rectifier to the conductive element of one capacitor to mount the rectifier on the one capacitor in insulated relation to the body means and to capacitively couple the rectifier sheath terminal to the body means, and said central terminal of the rectifier extending through the central apertures of the insulators and being electrically united to the conductive element of the other capacitor whereby to capacitively couple the central terminal of the rectifier to the body means.

17. An assembly for use in a high frequency electrical circuit, said assembly comprising a conductive body member having a wall formed with a through opening, a pair of rigid apertured insulating members disposed on opposite sides of the wall with their apertures aligned with the wall opening, a metallic coating on the outside of one of the insulating members and insulated by the latter from the wall, said metallic coating surrounding the aperture in such one member, an electrical component having an elongated central terminal projecting from one of its ends and an outer terminal surrounding and in insulated relation to the central terminal at said one end, said electrical component being mounted over the aperture in the one insulating member with the central terminal projecting through the wall opening and the aligned apertures of the insulating members and with the outer terminal electrically connected to the metallic coating of such one insulating member, conductive means on the outside of the other insulating member and insulated by the latter from the wall, and the central terminal being electrically connected to the conductive means on the outside of the latter, the metallic coating and the conductive means constituting armatures capacitively coupling the outer and central terminals of the electrical component to the wall.

18. An assembly for use in a high frequency electrical circuit, said assembly comprising a conductive body member having a wall formed with a through opening, a pair of rigid apertured insulating members disposed on opposite sides of the wall with their apertures aligned with the wall opening, a metallic coating on the outside of one of the insulating members and insulated by the latter from the wall, said metallic coating surrounding the aperture in such one member, an electrical component having an elongated central terminal projecting from one of its ends and an outer terminal surrounding and in insulated relation to the central terminal at said one end, said electrical component being mounted over the aperture in the one insulating member with the central terminal projecting through the wall opening and the aligned apertures of the insulating members and with the outer terminal electrically connected to the metallic coating of such one insulating member, conductive means on the outside of the other insulating member and insulated by the latter from the wall, said conductive means being formed with a central aperture through which is received the central terminal of the electrical component, and means electrically and physically uniting the central terminal and the conductive means, the metallic coating and the conductive means constituting armatures capacitively coupling the outer and central terminals of the electrical component to the wall.

19. An assembly for use in a high frequency electrical circuit, said assembly comprising a conductive body member having a wall formed with a through opening, a pair of rigid apertured insulating members disposed on opposite sides of the wall with their apertures aligned with the wall opening, a metallic coating on the outside of one of the insulating members and insulated by the latter from the wall, said metallic coating surrounding the aperture in such one member, an electrical component having an elongated central terminal projecting from one of its ends and an outer terminal surrounding and in insulated relation to the central terminal at said one end, said electrical component being mounted over the aperture in the one insulating member with the central terminal projecting through the wall opening and the aligned apertures of the insulating members and with the outer terminal electrically connected to the metallic coating of such one insulating member, conductive means on the outside of the other insulating member and insulated by the latter from the wall, said conductive means comprising a plate on the outside of such other insulating member and a tubular stem projecting through the aperture of the latter, and the central terminal of the electrical component being received within, located by and electrically connected to said tubular stem, the metallic coating and the conductive means constituting armatures capacitively coupling the outer and central terminals of the electrical component to the wall.

20. An assembly for use in a high frequency electrical circuit, said assembly comprising a conductive body member having a wall formed with a through opening, a rigid apertured insulating member disposed against the body member with its aperture aligned with the wall opening, an electrical component mounted on the body member and having an elongated terminal projecting through the aperture of the insulating member, conductive means on the outside of the insulating member and insulated by the latter from the wall, the terminal of the electrical component being physically and electrically united to the conductive means and the latter comprising an armature capacitively coupling the terminal to the body member wall, the body member being formed with an open ended socket spaced from the wall aperture and having conductive walls, an elongated resistor disposed in the socket and embraced by the conductive walls of the socket, said resistor having a terminal on one end electrically connected to the body member and another terminal on its other end projecting from the socket, and a conductor extending between and supported free of and spaced from the body member by the conductive means on the insulator and the projecting terminal of the resistor, said conductor being an inductive pickup for an electrical circuit comprising the electrical component and the resistor.

21. An assembly for use in a high frequency electrical circuit, said assembly comprising a conductive body member having a wall formed with a through opening, a rigid apertured insulating member disposed against the body member with its aperture aligned with the wall opening, an electrical component having an elongated central terminal projecting from one of its ends and an outer terminal surrounding and in insulated relation to the central terminal at said one end, said electrical component being mounted over the aperture in the insulating member with the central terminal projecting through the wall opening and said aperture, a metallic coating on and surrounding the aperture of the insulating member and insulated by the latter from the wall, the outer terminal of the electrical component being electrically connected to the metallic coating, said metallic coating comprising an armature capacitively coupling such outer terminal to the wall of the body member, the body member being formed with an open ended socket spaced from the wall aperture and having conductive walls, an elongated resistor disposed in the socket and embraced by the conductive walls of the socket, said resistor having a terminal on one end electrically connected to the body member and another terminal on its other end projecting from the socket, and a conductor extending between and supported free of and spaced from the body member by the projecting terminal of the resistor and the central terminal of the electrical component, said conductor being an inductive pickup for an electrical circuit comprising the electrical component and the resistor.

22. In a high frequency electrical system for detecting wave signals on a transmission line having a tubular conductor, said system being of the type comprising an indicator and detector circuit means providing coupling between the indicator and the line, the improvement in the detector circuit means which comprises in combination a support adapted to be mounted on the tubular conductor and a pickup detector unit carried by the support, said detector unit comprising a hollow conductive body that includes a base, electrical elements connected together in a detector circuit, some of said elements being carried by the body and including an inductive sensing element projecting into the field of energy transmitted through the conductor, another of said electrical elements being a resistor having an elongated body and conductive terminals at the opposite ends of such body, said conductive base being formed with a socket for endwise reception of a major portion of the resistor with the received resistor portion closely surrounded by the conductive socket walls in the provision of an electrical shield for such resistor portion, the terminal on the end of the resistor received in the socket being electrically connected to the base, and the terminal on the other end of the resistor being physically and electrically united to the inductive element to support the latter and to effect a series connection of the resistor between such inductive sensing element and the base.

References Cited in the file of this patent

UNITED STATES PATENTS

| | | |
|---|---|---|
| 2,412,393 | Ghosh | Dec. 10, 1946 |
| 2,423,416 | Sontheimer et al. | July 1, 1947 |
| 2,491,031 | Burgess | Dec. 13, 1949 |
| 2,575,799 | Doherty | Nov. 20, 1951 |
| 2,588,390 | Jones | Mar. 11, 1952 |
| 2,630,475 | Woodward | Mar. 3, 1953 |
| 2,667,618 | Waller | Jan. 26, 1954 |
| 2,668,946 | Bennett | Feb. 9, 1954 |